SAFETY HARNESS DEVICE
Filed April 9, 1968 2 Sheets-Sheet 1
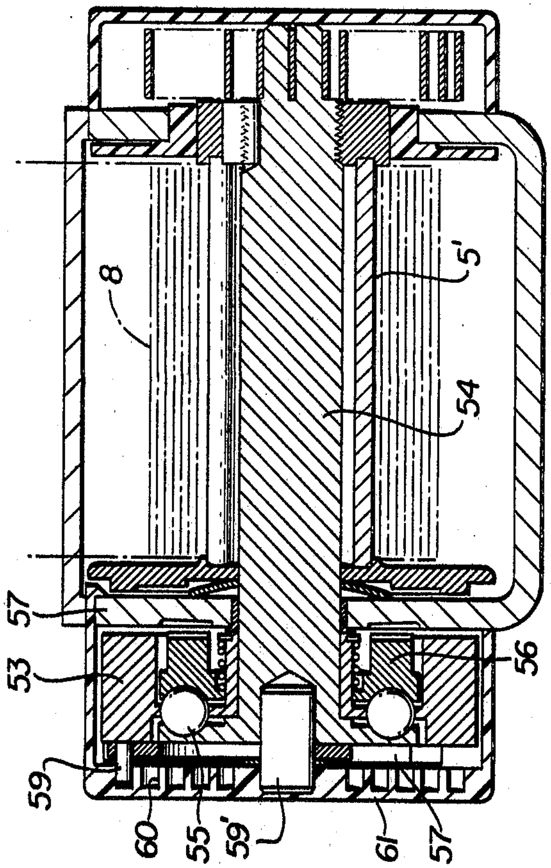
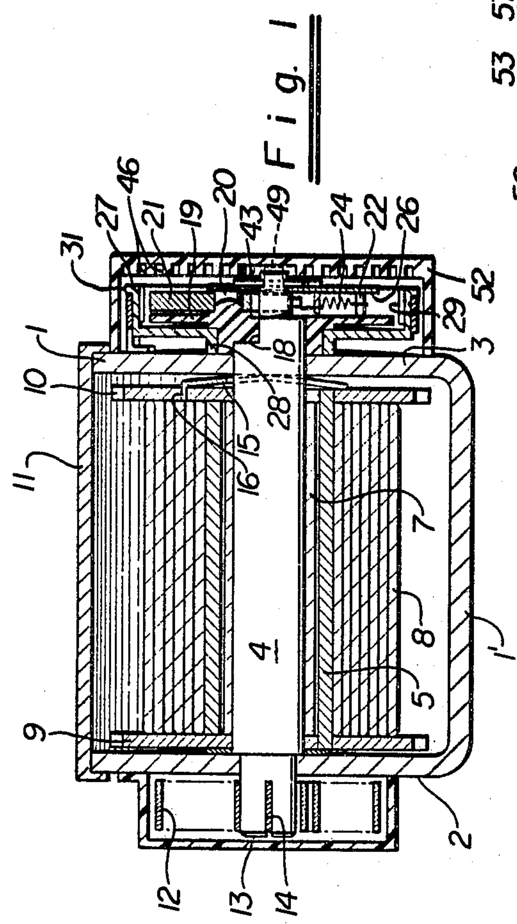
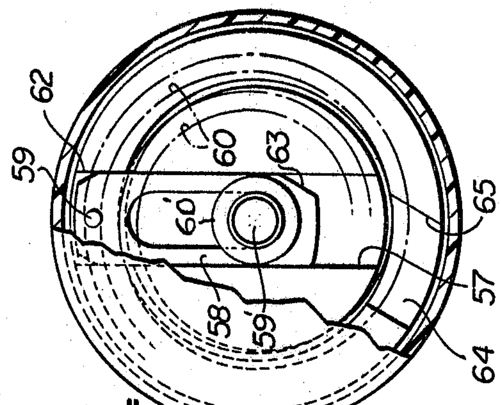
INVENTOR.
Robert J. Wrighton
William S. Wright, Jr.
BY
Paul B. Hunter
Attorney SAFETY HARNESS DEVICE
Filed April 9, 1968 2 Sheets-Sheet 2
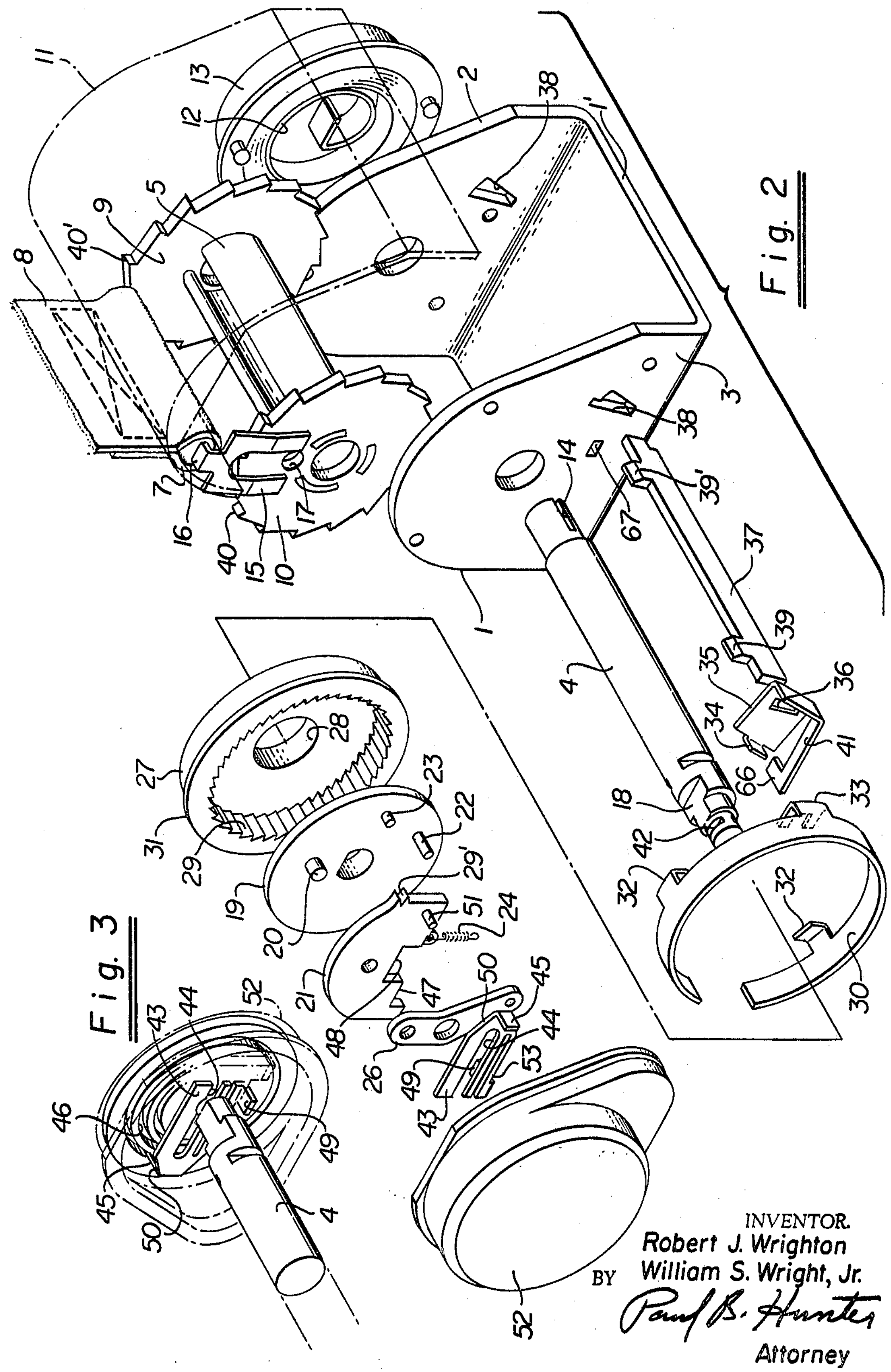
INVENTOR.
Robert J. Wrighton
William S. Wright, Jr.
BY Paul B. Hunter
Attorney United States Patent Office — 3,482,799 — Patented Dec. 9, 1969

3,482,799

SAFETY HARNESS DEVICE

Robert J. Wrighton, Anaheim, and William S. Wright, Jr., Orange, Calif., assignors to Pacific Scientific Company, City of Commerce, Calif., a corporation of California Filed Apr. 9, 1968, Ser. No. 719,911
Int. Cl. B65h 75/48
U.S. Cl. 242—107.4 3 Claims

ABSTRACT OF THE DISCLOSURE

A reel type retractor for a safety seat belt which embodies improved safety means for preventing locking of the reel during initial manual pay-out of the reel strap as well as means for effecting locking of the reel as the strap approaches its fully extended position, thus preventing accidental dislodgement of the strap from its reel in use. Additionally, inertia means are effective, after said initial manual pay-out, to lock said reel against further rotation responsive to sudden acceleration of said strap.

This invention relates generally to safety harnesses for protecting personnel in moving vehicles against injury due to sudden stops, crashes, etc., and the invention has reference, more particularly, to a novel inertia responsive reel structure especially suitable on automobiles and other land vehicles and actuated by the user's harness strap for automatically retaining the user in his seat in emergencies.

Safety harness devices of the general type herein involved have been developed over the years for use on aircraft, road and rail vehicles, etc. These devices generally combine a casing containing a spindle-supported reel mounted to turn and having a strap automatically wound thereon and unwound therefrom in response to movements of the user, such reel normally driving a spring loaded inertia member and co-operating locking means acting to lock the reel against rotation in case the strap, and hence the user, moves with respect to his seat at an excessive and dangerous acceleration.

Generally, these prior art devices were complicated in structure and expensive to manufacture and not always dependable in use. Also, such devices would often lock when the user attempted to attach the same to his seat belt, resulting in discomfort and, at times, in the failure of the user to attach the shoulder strap to his seat belt, thus defeating the purposes of the safety harness device. In co-pending application Ser. No. 660,674, now Patent No. 3,450,368, in which William S. Wright, Jr., one of the inventors herein, is an applicant, there is disclosed a safety harness device that is reliable in use, inexpensive to manufacture, and position insensitive, which can be set at relatively low acceleration rates including values of less than one-half G rate of the strap pay-out and which incorporates means to prevent locking of the reel while the shoulder strap is initially being withdrawn from the reel to attach the same to the user's body, as via his seat belt.

The principal object of the present invention is to provide a novel safety device incorporating the desirable features of the structure of said aforementioned patent application and which embodies improved safety means for preventing locking of the reel during initial manual pay-out of the reel strap as well as means for effecting locking of the reel as the strap approaches its fully extended position, thus preventing accidental dislodgment of the strap from its reel in use.

Other features and advantages of the present invention will become more apparent after a perusal of the following specification taken in connection with the accompanying drawings wherein:

FIG. 1 is a transverse sectional view of the novel safety harness device of this invention;

FIG. 2 is an exploded perspective view of the device of FIG. 1 showing how the various parts are assembled;

FIG. 3 is a perspective fragmentary view of a portion of the device looking from the opposite direction of that shown in FIG. 2;

FIG. 4 is a transverse sectional view of a somewhat modified safety harness device; and FIG. 5 is an end view, with parts broken away, of the structure of FIG. 4.

Similar characters of reference are used in the above figures to designate corresponding parts.

Referring now to FIGS. 1 through 3 of the drawings, the reference numeral 1 designates the frame member of the reel portion of the safety device, which frame member is of substantially U-shape having a base 1' that is adapted to be attached to a desired support in the vehicle, such as the back of the user's seat, or to the vehicle frame or door jamb as where the device is used in a land vehicle such as an automobile. The upstanding legs or end walls 2 and 3 of the frame member 1 are provided with aligned bearing apertures for rotatably supporting the transversely extending reel spindle or shaft 4 of a reel or spool 5, the shaft 4 having its end portions extending through the end wall apertures.

The hub of spool 5 is of substantially C-shaped cross-section with its inner surface somewhat spaced from the shaft 4 so as to accommodate the looped end 7 of a strap 8 which latter extends outwardly through the opening in the C-shaped spool hub portion. A portion of strap 8 is wrapped around the shaft 4 and extending outwardly is confined between guide flanges 9 and 10 fixed to the ends of the spool hub portion. A reel casing 11 carried by the end walls 2 and 3 covers the reel 5. The free end portion of strap 8 extends outwardly through the space provided between casing 11 and base 1 for attachment to the user's shoulder harness or seat belt. A portion of the strap 8 is normally maintained in wrapped condition about the spool 5 by means of a spiral spring 12 that has its outer end fixed to the inner wall of a spring cup 13 attached to the end wall 2 and its inner end fitted into a slot 14 provided in a reduced end portion of spindle 4. The spring 12 tends to wrap the strap 8 upon the spool 5 by turning the spool shaft 4 within the bearings in end walls 2 and 3.

A U-shaped bowed spring member 15 is interposed between the guide flange 10 and end wall 3 with its legs engaged in slots provided in the sides of spindle 4 (see FIGS. 1 and 2), and presses against these members 10 and 3 to cause the reel to turn with the spindle. Also, spring member or retainer 15 has a bent-over lug 16 engaged in an aperture 17 in flange 10 to retain the spindle 4 and spool 5 assembled. The portion of spindle 4 projecting outwardly of end wall 3 is provided with a flat step at 18 conformably fitting into the non-circular hub aperture of a circular flange member 19, whereby this latter member turns with spindle 5 in use. Flange member 19 has a cylindrical boss 20 thereon radially offset from the axis of spindle 4, and a substantially semi-circular inertia member or plate 21 is turnably mounted thereon with the axis of the boss 20 passing through the center of gravity of the inertia member 21. A pair of mutually spaced pins 22 and 23 project from flange member 19 adjacent the inertia member 21.

A coil calibration tension spring 24 has one end thereof connected to one edge of inertia member 21 at one side of the boss 20 and has its other end connected to pin 22 provided on flange member 19 and acts to normally hold inertia member 21 in abutting relation with pin 23. As will further appear, the tension of calibration spring 24 determines the G-setting of the safety harness device. An angular retainer plate 26 is mounted on a reduced end portion of spindle 4 and has apertures for passing over the ends of boss 20 and pin 22 to thereby retain the inertia member 21 and calibration spring 24 in place.

A circular cup member 27 has a hub portion 8 turnably mounted on the hub of flange member 19 and extends radially outwardly and over the inertia member 21. The interior cylindrical surface of cup member 27 is provided with ratchet teeth 29 for co-operating with a pair of similar teeth 29' provided on the peripheral surface of inertia member 21. A split annular clutch spring 30 embraces the outer cylindrical surface of cup member 27. The outer edge of this split clutch spring 30 abuts an annular retaining boss 31 formed on cup member 27 and the inner edge of this clutch spring has spaced fingers 32 formed thereon for engaging the exterior surface of end wall 3 for retaining the clutch spring 30 on the cup member 27. The clutch spring 30 resiliently grips the peripheral surface of cup member 27 with a definite predetermined pressure. Thus, the clutch spring 30 and cup member 27 constitute a preloaded clutch, whereby the clutch spring 30 tends to turn with the cup member 27 but will slip thereon if held against turning by a force exceeding a predetermined amount.

Clutch spring 30 has a bifurcated lug 33 projecting therefrom, within the bifurcation of which is engaged the bent-over tongue 34 of a biasing spring lever member 35. Lever member 35 is of substantially rectangular flat shape and is provided with an inclined rectangular opening 36 for conformably receiving an end of a transversely extending lock bar 37 that is pivotally supported at its end portions in sector shaped apertures 38 provided in the reel end walls 2 and 3. Lock bar 37 has two teeth 39, 39' formed thereon for respectively engaging teeth 40, 40' provided on the guide flanges 9 and 10. Lever member 35 has a narrow spring extension 41 that extends alongside end wall 3 and is provided with a bent-over end 66 that engages in a conforming opening 67 provided in this end wall. Spring extension 41 acting through lever member 35 tends to turn lock bar 37 clockwise, as viewed in FIG. 2, within its supporting sector apertures 38 in end walls 2 and 3 to normally retain teeth 39, 39' out of engagement with teeth 40, 40'. The end of the safety harness device containing the inertia member 21 and associated parts is shown enclosed within a cover 52 that is provided with snap fasteners for retaining the same on the end wall 3.

In operation, during normal movements of the user, the strap 8 is pulled out by the user when he leans forward in his seat, causing spring 12 to yield and unwind the strap 8 from reel 5, the flange member 19 and the inertia member 21 carried thereby turning with the reel 5, and when the user moves back in his seat the spring 12 rewinds strap 8 upon the reel. However, in the event of a crash resulting in a sudden deceleration of the vehicle, the user's body tends to be thrown forward suddenly so that strap 8 starts to pay out of the frame 1 with acceleration. Depending upon the tension of the calibration spring 24, if a predetermined dangerous acceleration of the user's body is reached, the inertia member 21 will tend to maintain its original velocity and hence will turn with respect to its pivotal support 20 on flange member 19, thus turning counter-clockwise as viewed in FIG. 2 away from pin 22 against the tension of calibration spring 24 so that its ratchet teeth 29' engage ratchet teeth 29 on the cup member 27 due to the eccentric mounting of this inertia member with respect to reel spindle 4. Thus, cup member 27 is now caused to turn clockwise with the reel, and clutch spring 30 turning therewith is caused through its bifurcated lug 33 to actuate lever member 35 and connected lock bar 37 counter-clockwise as viewed in FIG. 2 so that teeth 39 and 39' of this lock bar engage teeth 40 and 40' of the reel and lock both ends of the reel simultaneously against further pay-out of the strap 8. With the reel thereby held firmly at both ends, the spindle 4 is relieved of high torsional loads which otherwise would occur were the reel locked at one end only, so that the device is capable of withstanding enormous strap loads in use. The structure thus far described is quite similar to that disclosed in the above-identified application.

Should the teeth 39, 39' in moving to the locked position engage the tops of teeth 40, 40' so as not to lock instantly, the clutch spring 30 will slide momentarily over flange member 19 and enable lock bar teeth 39, 39' to hesitate momentarily and then move inwardly and fully engage the succeeding teeth 40, 40', so that no injury is caused to the locking mechanism. In practice, a typical reel of this invention has locked thousands of times without any malfunctioning.

Once the force on the strap 8 is relieved, then it will retract automatically through the action of the rewind spring 12. As the spring starts to rewind, the flange member 19 will start to turn counter-clockwise, as viewed in FIG. 2, causing the teeth 29' of the inertia member to disengage the teeth 29 of the cup member 27, and the calibration spring will turn the inertia member back against the pin 23, and the spring extension 41 will turn spring lever 35 and connected lock bar 37 so that the latter disengages the reel teeth 40 and 40', placing the reel in condition for another locking operation when required. There is no possibility of the device locking during wind-up of the strap 8.

When using the safety harness device on slower moving vehicles such as automobiles, it is often desired to set the same to lock at relatively low rates of acceleration of the strap pay-out. Rates as low as or lower than one-half of the acceleration of gravity, i.e., ½ G are often desired. When a device is set at such low rates, it sometimes becomes difficult for the user to extend the fully stowed webbing or strap out across the body, because it will often lock with the initial hand pull-out and resulting rapid initial acceleration of the strap. To prevent this inconvenience, the structure of this invention is provided with novel means for preventing locking during this initial pull-out. To this end, the shaft 4 is slotted at 42 for receiving a bifurcated slide member 43, the bifurcation or recess 44 of slide member 43 enabling this member to be inserted into slots 42 for sliding transversely of shaft 4 while turning therewith. Slide member 43 has an offset projection 45 at one end thereof for entering a spiral groove 46 provided in the inner wall of cover 52 and an off-set projection 49 at the other end thereof adapted to project into a stepped recess 47 provided in inertia member 21. Recess 47 adjoins a deeper recess 48 provided in the central portion of member 21.

During linear movement of the strap 8 the slide member 43 turns with the circular flange member 19 since both are mounted to turn with shaft 4. During initial hand pull-out of the strap, the offset projection 45 is positioned in spiral groove 46 so that the slide member projection 49 abuts the edge of recess 47, whereby, should the inertia member 19 tend to turn counterclockwise as viewed in FIG. 2 due to excessive initial acceleration of the strap (which is often the case), the edge of recess 47 will prevent such relative turning motion of the inertia member on the boss 20 and thus prevent teeth 29' from engaging teeth 29 to lock the reel. However, after the initial pull-out of the strap, the projection 49 will enter the deeper recess 48 of inertia member 21 so that with the strap 8 attached to the user's body any excessive acceleration of the strap will cause locking of the device to protect the user from injury since the edge of recess 47 can no longer prevent relative turning of the inertia member 21 on its pivotal boss 20. If desired, the arm 53 of bifurcated slide member 43 carrying the projection 49 may be made resilient, providing a more graduated control of the accelerating force necessary to lock the reel, which is desirable in certain installations.

As the strap 8 approaches its fully paid-out or extended position as during a crash so that only a turn or so of the same remains wrapped around the spool 5, beveled edge 50 of the slide member 43 will strike a pin 51 on the inertia member 21, and, as the slide member 43 continues to move, the pin 51 will be cammed upwardly as viewed in FIG. 2 causing the teeth 29′ to engage teeth 29 and effect locking of the reel so that some strap remains wrapped around the spool 5, thus providing snubbing action and preventing accidental pull-out of the strap from the spool due to the great tensions occurring after locking of the reel.

The safety harness device shown in FIGS. 4 and 5 is basically similar to that disclosed in co-pending application Ser. No. 621,572, now Patent No. 3,402,899, in which William S. Wright, Jr., one of the inventors herein, is an applicant, and this structure is shown provided with the novel safety features of this invention. In this structure, excessive acceleration of the strap 8 will cause relative turning of the flywheel type inertia member 53 with respect to the shaft or spindle 54 causing the balls 55 to force clutch member 56 to lock against the end wall 57.

The enlarged end of spindle 54 having tapered grooves receiving balls 55 is provided on its outer face with a transverse slot 57 within which is slidable a slide member 58 retained therein as by pin 59′ fixed in spindle 54 and carrying a retaining ring 60′. The outer end of slide member 58 carries a projection 59 that rides in spiral groove 60 provided in the cover 61. With the slide member 58 as shown in FIGS. 4 and 5, the end portion of slide member 58 projects into a transverse slot 62 in the rim of the inertia member 53. In this position of this slide member the strap 8 is fully retracted, i.e., fully wound on spool 5′. As the strap is initially manually extended, the slide member rotating with the spindle 54 and extending into the inertia member slot 62 prevents relative turning of the flywheel and spindle so that the device cannot lock, regardless of the initial acceleration.

As the strap 8 extends outwardly more and more the projection 59 follows the spiral groove 60 in the cover 61 causing the projection 59 to travel toward the center of the reel, but until the slide member clears the rim of the flywheel inertia member no locking can take place. As the strap extends further and the slide member moves toward the center of the spindle as during normal operation of the device, locking of the same will occur if sufficient acceleration is applied to the strap 8, since relative turning of the inertia member and spindle 54 is permitted.

As the strap approaches the fully extended position, a bevel 63 on the slide member will enter a transverse slot 64 in the inertia flywheel rim and engaging a beveled edge 65 will cam the inertia member counter-clockwise as viewed in FIG. 5 resulting in differential travel between the spindle 54 and inertia member 53 causing the reel to become locked against further extension and preventing the strap from pulling off the spool 5′.

Thus it will be seen that the novel safety harness device of this invention provides simply constructed and reliable safety features which prevent the inadvertent locking of the device during initial pull-out of the strap and which also prevent the inadvertent pull-off of the strap from the reel when the strap is fully extended due to the snubbing action of the strap portion still remaining on the spool.

Since many changes could be made in the above construction and many apparently widely different embodiments of this invention could be made without departing ing from the scope thereof, it is intended that all matter contained in the above description or shown in the accompanying drawings shall be interpreted as illustrative and not in a limiting sense.

What is claimed is:

1. In a safety harness device of the character described, a frame member having a cover member, a harness reel rotatably carried by said frame member, a strap wound on said reel, an inertia member carried by said reel and mounted for limiting turning movement with respect thereto, locking mechanism actuated by said inertia member and connected for locking said reel against turning in the event of excessive acceleration of said strap outwardly of said reel, and safety means for preventing locking of said reel during the initial manual pull-out of the strap, said safety means comprising a slide member carried by said reel and turnable therewith during movement of said strap, said frame member cover having a spiral groove therein, said slide member having a projection for engaging the spiral groove in said cover for effecting sliding movement of said slide member with respect to said inertia member during strap movement, said slide member being positioned during the initial pull-out of the strap for engaging the inertia member to prevent locking said reel, said slide member moving out of engagement with said inertia member during normal operation of the safety harness device to permit locking of the reel in the event of excessive acceleration of the strap.

2. A harness device as claimed in claim 1 wherein said slide member, moving as said strap approaches its fully extended position, acts to engage said inertia member to cause the relative motion thereof with respect to said reel resulting in the actuation of said locking mechanism to effect the locking of the reel and thereby prevent the pull-out of the strap as the latter approaches its fully extended position, the snubbing action of the strap on the reel serving to retain the same thereon.

3. A safety harness as defined in claim 2 wherein said slide member has a resilient projection thereon for engaging said inertia member during the early pull-out of said strap to provide a predetermined variable control of the acceleration at which said inertia member is allowed to actuate said locking mechanism to effect locking of said safety harness device.

References Cited

UNITED STATES PATENTS

| | | | |
|---|---|---|---|
| 2,845,234 | 7/1958 | Cushman et al. | 242—107.4 |
| 3,174,704 | 3/1965 | Replogle | 242—107.4 |
| 3,338,532 | 8/1967 | Board et al. | 242—107.4 |
| 3,430,891 | 3/1969 | Burleigh | 242—107.4 |

STANLEY N. GILREATH, Primary Examiner

W. H. SCHROEDER, Assistant Examiner